(12) United States Patent
Urabe

(10) Patent No.: US 9,486,959 B2
(45) Date of Patent: Nov. 8, 2016

(54) METHOD FOR PRODUCING LAMINATE

(71) Applicant: The Yokohama Rubber Co., LTD., Minato-ku, Tokyo (JP)

(72) Inventor: Koji Urabe, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/769,793

(22) PCT Filed: Jan. 30, 2014

(86) PCT No.: PCT/JP2014/000479
§ 371 (c)(1),
(2) Date: Aug. 21, 2015

(87) PCT Pub. No.: WO2014/129121
PCT Pub. Date: Aug. 28, 2014

(65) Prior Publication Data
US 2016/0001502 A1    Jan. 7, 2016

(30) Foreign Application Priority Data
Feb. 22, 2013  (JP) ................... 2013-033056

(51) Int. Cl.
  B29C 65/00  (2006.01)
  B29C 43/28  (2006.01)
  (Continued)

(52) U.S. Cl.
CPC ......... B29C 66/92615 (2013.01); B29B 11/10 (2013.01); B29C 43/28 (2013.01); B29C 43/30 (2013.01); B29C 43/58 (2013.01); B29C 47/0004 (2013.01); B29C 47/0019 (2013.01);
(Continued)

(58) Field of Classification Search
CPC .......... B32B 37/0053; B32B 37/1054; B32B 37/203; B32B 41/00; B32B 25/10; B32B 2433/02; B32B 2413/00; B32B 2309/72; B32B 2309/105; B32B 2309/08; B29B 11/10; B29C 66/92615; B29C 65/745; B29C 47/0004; B29C 47/0019; B29C 47/92; B29C 65/7894; B29C 66/45; B29C 2947/92152
USPC .................. 156/64, 351, 378, 358, 359, 360
See application file for complete search history.

(56) References Cited

FOREIGN PATENT DOCUMENTS

| JP | S59-057732 | 4/1984 |
|---|---|---|
| JP | S62-151311 | 7/1987 |

(Continued)

OTHER PUBLICATIONS

Translation of JP H08-0192474, Jul. 30, 1996, Bridgestone Corp.*
(Continued)

*Primary Examiner* — George Koch
(74) *Attorney, Agent, or Firm* — Thorpe North & Western

(57) ABSTRACT

In the present technology, when rolling rubber material extruded from a first rubber extruder (32) with a first pair of rollers (36, 36) to form a first sheet-shaped member (S1) and layering and rolling the first sheet-shaped member (S1) and the second sheet-shaped member (S2) supplied from an original material with a second pair of rollers (38, 38) to contiguously produce a laminate having the first sheet-shaped member (S1) and a second sheet-shaped member (S2) laminated therein, the gap between the first pair of rollers (36, 36) is controlled on the basis of the detection result of the thickness (d1) of the first sheet-shaped member (S1) rolled by the first pair of rollers (36, 36), the detection result of the thickness (d2) of the second sheet-shaped member (S2) supplied from the original material, and the detection result of the thickness (d3) of the laminate body.

5 Claims, 6 Drawing Sheets

(51) Int. Cl.

| | | |
|---|---|---|
| *B29C 43/30* | (2006.01) | |
| *B29C 43/58* | (2006.01) | |
| *B32B 37/15* | (2006.01) | |
| *B32B 41/00* | (2006.01) | |
| *B29B 11/10* | (2006.01) | |
| *B29C 47/00* | (2006.01) | |
| *B29C 47/92* | (2006.01) | |
| *B29C 65/74* | (2006.01) | |
| *B29C 65/78* | (2006.01) | |
| *B32B 25/10* | (2006.01) | |
| *B32B 37/00* | (2006.01) | |
| *B32B 37/10* | (2006.01) | |
| *B32B 37/20* | (2006.01) | |
| *B32B 37/02* | (2006.01) | |
| *B32B 38/00* | (2006.01) | |
| *B29K 9/00* | (2006.01) | |
| *B29L 31/00* | (2006.01) | |
| *B29C 43/24* | (2006.01) | |
| *B29K 21/00* | (2006.01) | |
| *B29K 105/26* | (2006.01) | |
| *B29K 621/00* | (2006.01) | |
| *B29L 29/00* | (2006.01) | |

(52) U.S. Cl.
CPC ............ *B29C 47/92* (2013.01); *B29C 65/745* (2013.01); *B29C 65/7894* (2013.01); *B29C 66/45* (2013.01); *B32B 25/10* (2013.01); *B32B 37/0053* (2013.01); *B32B 37/02* (2013.01); *B32B 37/1054* (2013.01); *B32B 37/153* (2013.01); *B32B 37/203* (2013.01); *B32B 41/00* (2013.01); *B29C 43/24* (2013.01); *B29C 47/004* (2013.01); *B29C 2043/5825* (2013.01); *B29C 2947/92152* (2013.01); *B29C 2947/92428* (2013.01); *B29C 2947/92438* (2013.01); *B29C 2947/92647* (2013.01); *B29C 2947/92923* (2013.01); *B29K 2009/00* (2013.01); *B29K 2021/00* (2013.01); *B29K 2105/26* (2013.01); *B29K 2621/00* (2013.01); *B29L 2029/00* (2013.01); *B29L 2031/7092* (2013.01); *B32B 38/0004* (2013.01); *B32B 38/105* (2013.01); *B32B 2309/08* (2013.01); *B32B 2309/105* (2013.01); *B32B 2309/72* (2013.01); *B32B 2413/00* (2013.01); *B32B 2433/02* (2013.01)

(56) References Cited

FOREIGN PATENT DOCUMENTS

| | | |
|---|---|---|
| JP | H04-0333406 | 11/1992 |
| JP | H05-301299 | 11/1993 |
| JP | H08-0192474 | 7/1996 |
| JP | H09-048511 | 2/1997 |
| JP | 2001-038757 | 2/2001 |

OTHER PUBLICATIONS

Translation of JP 2001-038757, Feb. 13, 2001, Bridgestone Corp.*
International Search Report for International Application No. PCT/JP2014/000479 dated May 13, 2014, 4 pages, Japan.

* cited by examiner

METHOD FOR PRODUCING LAMINATE

This application is a national stage entry of PCT/JP2014/000479, filed Jan. 30, 2014

TECHNICAL FIELD

The present technology relates to a method for producing a laminate.

BACKGROUND

Conveyor belts are known which are provided with a belt core body, a front side cover rubber and a back side cover rubber laminated on the front surface and the rear surface of the belt core body, respectively, and an ear rubber arranged on both side sections of the belt core body in the width direction between these cover rubbers.

Conventionally, as a method for producing such a conveyor belt, a method is known which comprises the steps of: (1) mixing rubber material, (2) rolling and molding the belt core body, (3) rolling and molding the cover rubbers, (4) molding the ear rubber, (5) molding a conveyor belt by assembling each material supplied from each of the steps (2), (3), and (4) which are separately independent, (6) vulcanizing the formed conveyor belt, and (7) performing finishing on the conveyor belt after vulcanization.

The thickness of the conveyor belt which is the product to be finally obtained is the total of the thicknesses of the belt core body and the cover rubbers.

Because respective variations in the thicknesses of the belt core body, the cover rubbers, and the ear rubber are generated in the individual steps, there are limits in terms of reducing variations in the thickness of the conveyor belt to be finally molded.

If the thickness of the conveyor belt is excessive, defects are easily generated in the surface of the conveyor belt in the vulcanization step, in addition, there are disadvantages in that material is wasted and the production costs are increased.

Japanese Unexamined Patent Application Publication No. H05-301299A discloses extruding and rolling a cover rubber from a first extrusion rolling apparatus onto one side surface of a belt core body unwound from a core body unwinding stand, extruding and rolling a cover rubber from a second extrusion rolling apparatus onto the other side surface of the belt core body, contiguously vulcanizing the formed rubber sheet while contiguously supplying the sheet to correspond to the vulcanizing time of a continuous vulcanizer, and contiguously winding the vulcanized conveyor belt main body using a winding apparatus.

In the producing method described above in which the cover rubbers are contiguously rolled on the front surface and the rear surface of the belt core body, it is not specifically disclosed how variations in the thickness of the conveyor belt to be finally obtained are reduced.

SUMMARY

The present technology provides a method for producing a laminate, which is advantageous in terms of reducing variations in the thickness of a laminate having a first sheet-shaped member and a second sheet-shaped member laminated therein.

The present technology includes a method for producing a laminate including a first step of rolling rubber material extruded from a first rubber extruder with a first pair of rollers to form a first sheet-shaped member, and a second step of layering and rolling the first sheet-shaped member and a second sheet-shaped member supplied from an original material to contiguously produce a laminate having the first sheet-shaped member and the second sheet-shaped member laminated therein. In such a method, a gap between the first pair of rollers is controlled on the basis of a detection result of a thickness d1 of the first sheet-shaped member rolled by the first pair of rollers, a detection result of a thickness d2 of the second sheet-shaped member supplied from the original material, and a detection result of a thickness d3 of the laminate.

In accordance with the present technology, since it is possible to adjust the thickness of the first sheet-shaped member according to variations in the thickness of the second sheet-shaped member so that the thickness of the laminate matches a target value, there is an advantage in terms of reducing variations in the thickness of the laminate having the first sheet-shaped member and the second sheet-shaped member laminated therein.

BRIEF DESCRIPTION OF THE DRAWINGS

FIG. 1A illustrates a state before cutting both side end sections B, and FIG. 1B illustrates a state after cutting the both side end sections B.

DETAILED DESCRIPTION

Description will be given of a method for producing a laminate of an embodiment of the present technology with reference to the drawings.

In the present embodiment, description will be given of each of a case where the laminate is a belt core body, a case where the laminate is an intermediate product such as an intermediate laminate to be described below, and a case where the laminate is a conveyor belt as a final product.

First, description will be given of the configuration of the conveyor belt.

Figure 1A:
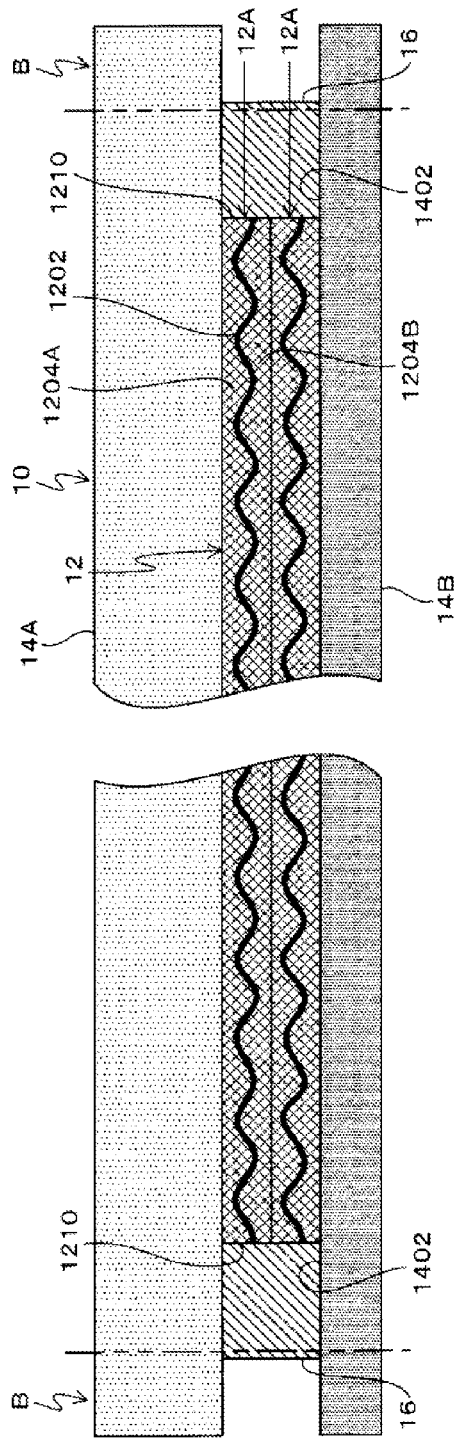
FIGS. 1A and 1B are cross-sectional views of a conveyor belt 10 that is cut along a plane parallel with the width direction thereof.
Figure 1B:
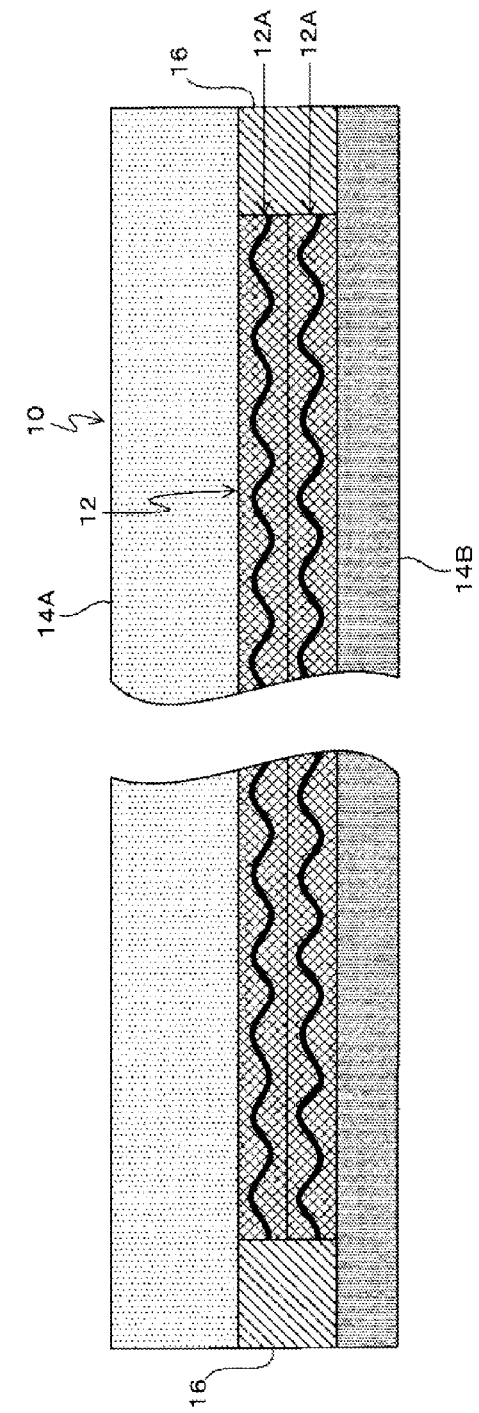

FIGS. 1A and 1B are cross-sectional views of a conveyor belt 10 that is cut along a plane parallel with the width direction thereof, FIG. 1A illustrates a state before cutting both side end sections B, and FIG. 1B illustrates a state after cutting the both side end sections B.

The conveyor belt 10 includes a belt core body 12, a first cover rubber 14A, a second cover rubber 14B, and an ear rubber 16.

The belt core body 12 is a body in which a plurality of belt core single bodies 12A are laminated. The belt core single bodies 12A each include a fiber reinforcement layer 1202, a first coating rubber 1204A laminated on one surface of the fiber reinforcement layer 1202, and a second coating rubber 1204B laminated on the other surface of the fiber reinforcement layer 1202.

The first cover rubber 14A is laminated on one surface of the belt core body 12.

The second cover rubber 14B is laminated on the other surface of the belt core body 12.

In the present embodiment, description will be given of a case where a front side cover rubber of the belt conveyor 10 on which articles are placed is formed by the first cover rubber 14A and a back side cover rubber of the belt conveyor 10 is formed by the second cover rubber 14B.

However, it goes without saying that the present technology is also applicable in a case where the front side cover rubber is formed by the second cover rubber 14B and the back side cover rubber is formed by the first cover rubber 14A, in the opposite manner to the description above.

The ear rubber 16 is arranged on both side sections of the belt core body 12 in the width direction between the first cover rubber 14A and the second cover rubber 14B.

In addition, the reference numeral 1402 indicates an ear rubber placement surface on a second sheet-shaped member S2 having the belt core body 12 and the second cover rubber 14b laminated therein as will be described below. That is, in the second sheet-shaped member S2, the width of the belt core body 12 is less than the width of the second cover rubber 14B, and the second sheet-shaped member S2 has a band-like ear rubber placement surface 1402 formed to have dimensions corresponding to the width of the ear rubber 16 at both sides in the width direction of a surface of the second cover rubber 14B having the belt core body 12 laminated thereon.

Description will be given of the step of producing the conveyor belt 10.

The conveyor belt 10 is produced by the following steps.

1) Production of belt core single body 12A: first and second coating rubbers 1204A and 1204B are laminated on the fiber reinforcement layer 1202.

2) Production of belt core body 12: a plurality of the belt core single bodies 12A are laminated.

3) Production of first intermediate laminate: the second cover rubber 14B is laminated on the belt core body 12.

4) Production of conveyor belt 10: the ear rubber 16 is laminated on the first intermediate laminate and then the first cover rubber 14A is laminated.

The method for producing a laminate in accordance with the present technology is applied to steps 1), 2), and 4) described above.

Next, description will be given of a configuration of the production apparatus 30 used in the method for producing a laminate of the present technology.

Figure 2:
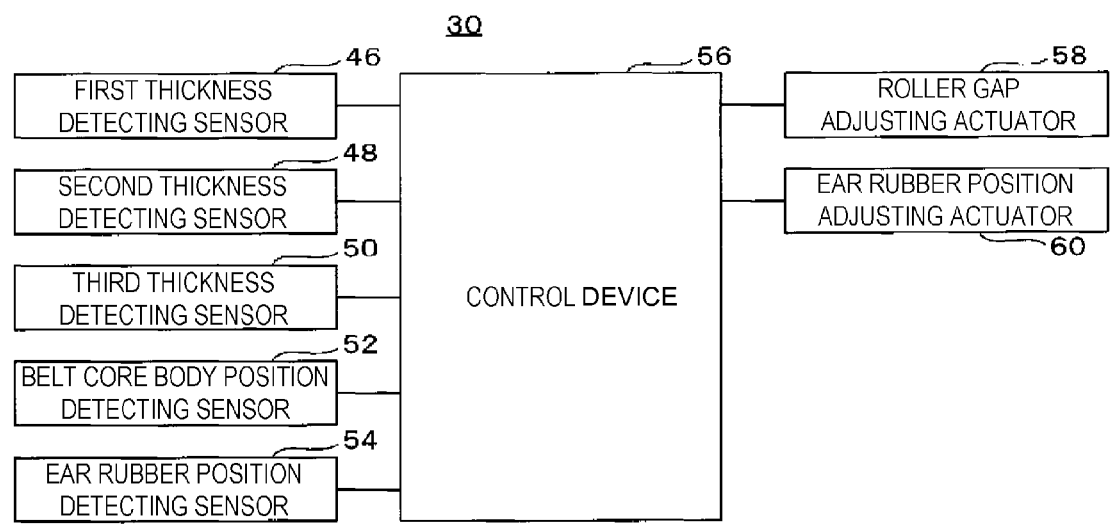
FIG. 2 is a block diagram illustrating a configuration of a control system of a laminate production apparatus 30.
Figure 6:
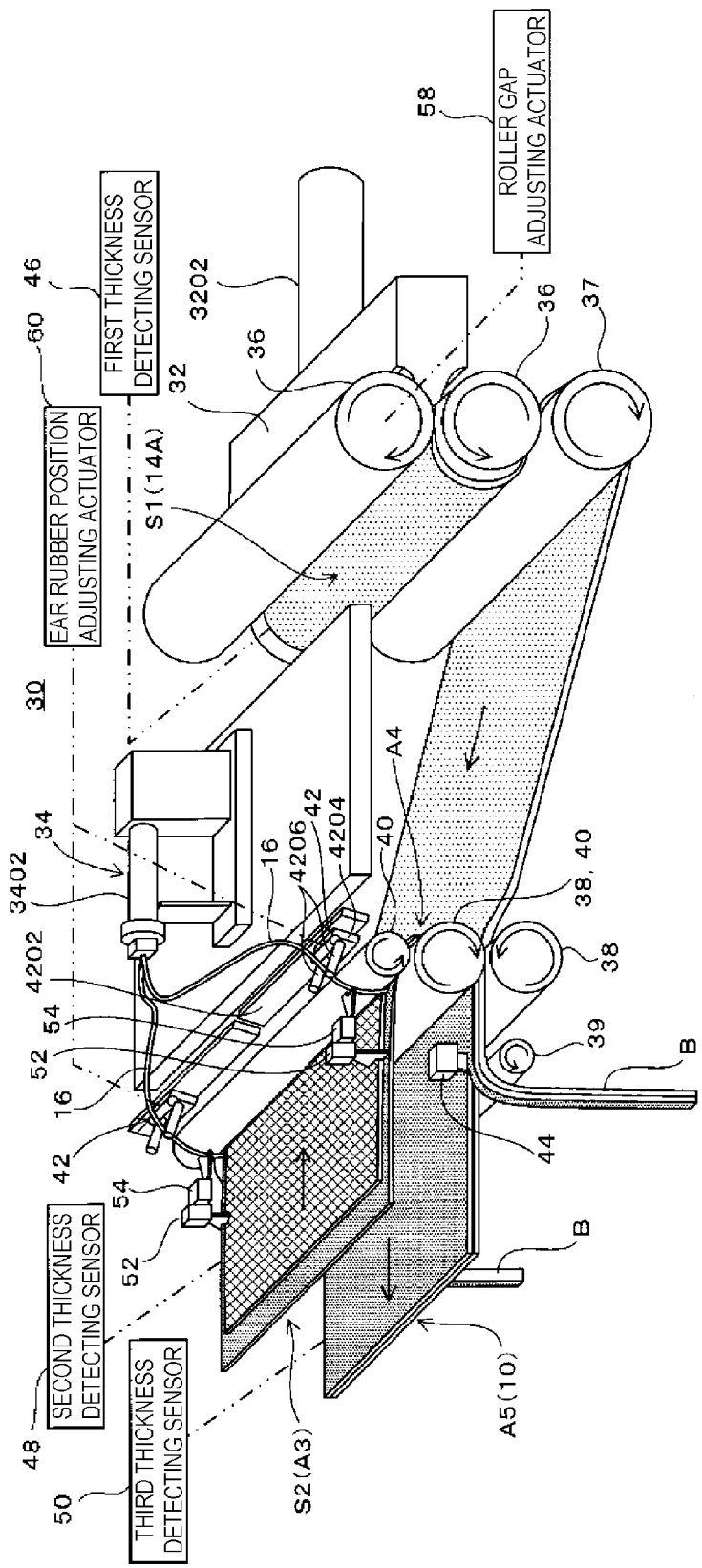
FIG. 6 is an explanatory diagram of a step of producing a belt conveyor 10 by laminating an ear rubber 16 on the first intermediate laminate A3 and laminating a first cover rubber 14A in the method for producing a laminate according to the embodiment.

As illustrated in FIG. 2 and FIG. 6, the production apparatus 30 includes a first rubber extruder 32, a second rubber extruder 34, a first pair of rollers 36 and 36, a second pair of rollers 38 and 38, a third pair of rollers 40 and 40, positioning structure 42, cutting structure 44, transport structure (not illustrated), first to third thickness detecting sensors 46, 48, and 50, a belt core body position detecting sensor 52, an ear rubber position detecting sensor 54, and control device 56.

The first rubber extruder 32 extrudes rubber material, which is supplied via a cylindrical tube 3202 having a screw shaft built therein, from a mouthpiece of an extruding head, so that the rubber material is discharged as a sheet-shaped member to be rolled.

In order to flatten the cross-sectional shape of the sheet-shaped member to be rolled, the first rubber extruder 32 has a structure in which the mouthpiece of the head and a plate that is capable of varying flow characteristics in the head are configured to be detachable according to the characteristics of the rubber.

The second rubber extruder 34 extrudes rubber material, which is supplied via a cylindrical tube 3402 having a screw shaft built therein, from a mouthpiece of an extruding head, so that the rubber material is discharged as the ear rubber 16. FIG. 6 exemplifies a case where two strips of the ear rubber 16 are discharged from one second rubber extruder 34; however, two second rubber extruders 34 may be provided and one strip of the ear rubber 16 may be discharged from each of the second rubber extruders 34.

The first pair of rollers 36 and 36 are rotatably supported with a vertical interval provided therebetween and with the axes thereof oriented in the horizontal direction and are rotated and driven in the opposite directions to each other. The first pair of rollers 36 and 36 roll the sheet-shaped member to be rolled to form a first sheet-shaped member S1.

The first pair of rollers 36 and 36 are provided so that the gap therebetween can be adjusted by a roller gap adjusting actuator 58, and adjusting the gap causes the thickness of the first sheet-shaped member S1 to be adjusted.

The first pair of rollers 36 and 36 are provided so that the intersection angle of the axes of the rollers 36 and 36 can be adjusted by an intersection adjusting actuator (not illustrated), and adjusting the intersection angle causes the planarity of the first sheet-shaped member S1 to be adjusted.

As the roller gap adjusting actuator 58 and the intersection adjusting actuator, for example, various conventionally known mechanisms such as a mechanism employing a feed screw and motor, and a mechanism employing a hydraulic cylinder can be used.

In the diagrams, the reference numeral 37 is a guide roller for guiding the first sheet-shaped member S1 to the second pair of rollers 38.

The second pair of rollers 38 and 38 are rotatably supported with a vertical interval provided therebetween and with axes thereof oriented in the horizontal direction and are rotated and driven in the opposite directions to each other. The second pair of rollers 38 and 38 roll the first sheet-shaped member S1 layered with the second sheet-shaped member S2 supplied from the original material to contiguously produce a laminate having the first sheet-shaped member S1 and the second sheet-shaped member S2 laminated therein.

In the diagram, 39 is a guide roller guiding, to the downstream side, the laminate fed out from the second pair of rollers 38 and 38.

The second pair of rollers 38 and 38 are provided so that the gap therebetween can be adjusted by a roller gap adjusting actuator (not illustrated), and adjusting the gap causes the thickness of the laminated sheet-shaped member (the laminate having the first sheet-shaped member S1 and the second sheet-shaped member S2 laminated therein) to be regulated.

The third pair of rollers 40 and 40 are rotatably supported with a vertical interval provided therebetween and with axes thereof oriented in the horizontal direction. The third pair of rollers 40 and 40 are rotated and driven in the opposite directions to each other.

In a case of producing a laminate (the conveyor belt 10) having the ear rubber 16 laminated therein, the third pair of rollers 40 and 40 function as guide rollers for guiding the second sheet-shaped member S2 supplied from the original material to the second pair of rollers 38 and 38 and roll the ear rubber 16 extruded from the second rubber extruder 34 on the second sheet-shaped member S2 to laminate the ear rubber 16.

In addition, in a case of producing a laminate in which the ear rubber 16 is not laminated, the third pair of rollers 40 and 40 function only as guide rollers for guiding the second sheet-shaped member S2 supplied from the original material to the second pair of rollers 38 and 38.

In addition, in the present embodiment, one roller 38 of the second pair of rollers 38 and 38 doubles as one roller 40 of the third pair of rollers 40 and 40.

The positioning structure 42 positions the ear rubber 16 extruded from the second rubber extruder 34 in the width direction of the second cover rubber 14B with respect to the ear rubber placement surfaces 1402 of the second sheet-shaped member S2 illustrated in FIGS. 1A and 1B.

The positioning structure 42 includes a rail 4202 provided on the frame of the production apparatus 30 and extending in the width direction of the second sheet-shaped member S2, a moving body 4204 provided to be able to slide along the rail 4202, guide rollers 4206 integrally attached to the moving body 4204 and guiding the ear rubber 16, and an ear rubber position adjusting actuator 60 sliding the moving body 4204.

As the ear rubber position adjusting actuator 60, for example, various conventionally known mechanisms such as a mechanism employing a feed screw and motor, and a mechanism employing a hydraulic cylinder can be used.

As illustrated in FIG. 1A, the cutting structure 44 cut both side end sections B in the width direction of the laminate fed out from the second pair of rollers 38 and 38 using a cutter. Virtual lines indicate portions to be cut in FIG. 1A.

Transport structure (not illustrated) contiguously return the both side end sections B, which are cut, to the upstream side of the first rubber extruder 32. Accordingly, the both side end sections B, which are cut, are used as rubber material by the first rubber extruder 32.

The first thickness detecting sensor 46 detects the thickness d1 of the first sheet-shaped member S1 rolled by the first pair of rollers 36 and 36.

The second thickness detecting sensor 48 detects the thickness d2 of the second sheet-shaped member S2 supplied from the original material.

The third thickness detecting sensor 50 detects the thickness d3 of the laminate fed out from the second rollers.

As the first to third thickness detecting sensors 46, 48, and 50, various conventionally known sensors such as a contact type sensor or a non-contact type sensor can be used.

The belt core body position detecting sensor 52 detects the positions of the end surfaces on both sides in the width direction of the belt core body 12 directly before being rolled by the third pair of rollers 40 and 40.

The ear rubber position detecting sensor 54 detects the position in the width direction of the ear rubber 16 directly before being rolled by the third pair of rollers 40 and 40.

As the belt core body position detecting sensor 52, a two-dimensional displacement sensor can be used which detects level differences in the positions of a lower surface rubber sheet (the second cover rubber 14B) and a core body (the belt core body 12) as the positions of end surfaces on both sides of the belt core body 12 in the width direction by irradiating the end surfaces of the belt core body 12 in the width direction with linear detection light so that the linear detection light is orthogonal to the end surfaces and detecting the reflected light.

In the same manner as the description above, as the ear rubber position detecting sensor 54, a two-dimensional displacement sensor can be used which detects the end section positions of the ear rubber 16 as the positions of the ear rubber 16 in the width direction by irradiating the end surfaces of the ear rubber 16 in the width direction with linear detection light so that the linear detection light is orthogonal to the end surfaces and detecting the reflected light.

As illustrated in FIG. 2, the control device 56 includes a central processing unit (CPU), a read-only memory (ROM) in which a control program and the like are recorded and stored, a random-access memory (RAM) as a control program operating region, an electrically erasable programmable read-only memory (EEPROM) which holds various types of data to be rewritable, and a microcomputer including an interface section which is an interface with a peripheral circuit or the like.

By executing the control program, the control device 56 drive the roller gap adjusting actuator 58 on the basis of the detection result, detected by the first thickness detecting sensor 46, of the thickness d1 of the first sheet-shaped member S1, the detection result, detected by the second thickness detecting sensor 48, of the thickness d2 of the second sheet-shaped member S2 supplied from the original material, and the detection result, detected by the third thickness detecting sensor 50, of the thickness d3 of the laminate fed out from the second pair of rollers 38 and 38 to control the gap between the first pair of rollers 36 and 36.

Thereby, the thickness d3 of the laminate fed out from the second pair of rollers 38 and 38 is controlled so as to be a target value.

In addition, the control device 56 control the positioning of the ear rubber 16 with the positioning structure 42 on the basis of the detection result P1, detected by the belt core body position detecting sensor 52, of the positions of end surfaces on both sides in the width direction of the belt core body 12 directly before being rolled by the third pair of rollers 40 and 40 and the detection result of the position P2, detected by the belt ear rubber position detecting sensor 54, in the width direction of the ear rubber 16 directly before being rolled by the third pair of rollers 40 and 40.

Thereby, as illustrated in FIG. 1A, the ear rubber 16 is laminated on the second cover rubber 14B without forming a gap between the end surfaces 1210 and the ear rubber 16 on both sides in the width direction of the belt core body 12 and without overlapping with the end surfaces 1210.

Next, description will be given of the steps of producing the conveyor belt 10 in order of the above-described 1) producing the belt core single body 12A, 2) producing the belt core body 12, 3) producing the first intermediate laminate, and 4) producing the conveyor belt 10.

Figure 3:
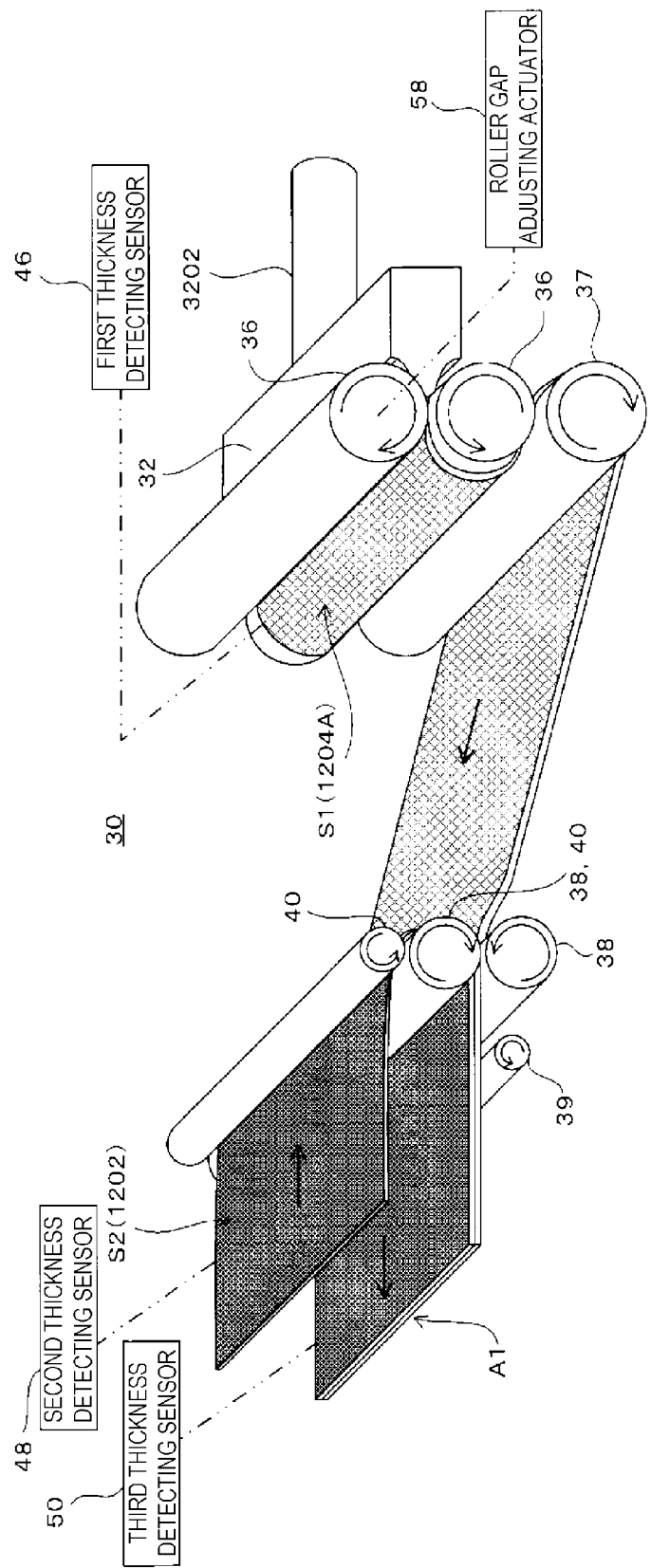
FIG. 3 is an explanatory diagram of a step of producing an intermediate product of a belt core body 12 by laminating a fiber reinforcement layer 1202 and a first coating rubber 1204A in a method for producing a laminate according to an embodiment.
Figure 4:
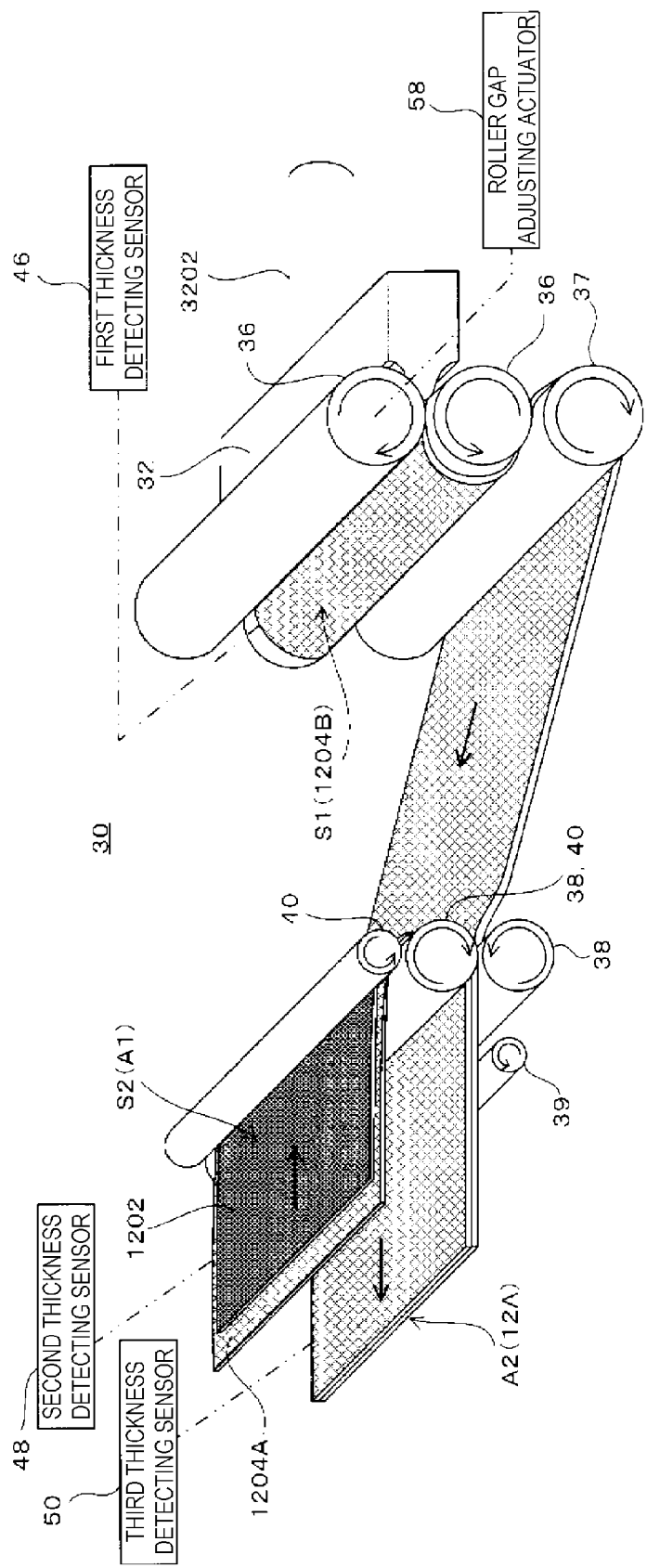
FIG. 4 is an explanatory diagram of a step of producing a belt core single body 12A by laminating the intermediate product of the belt core body 12 and a second coating rubber 1204B in the method for producing a laminate according to the embodiment.
Figure 5:
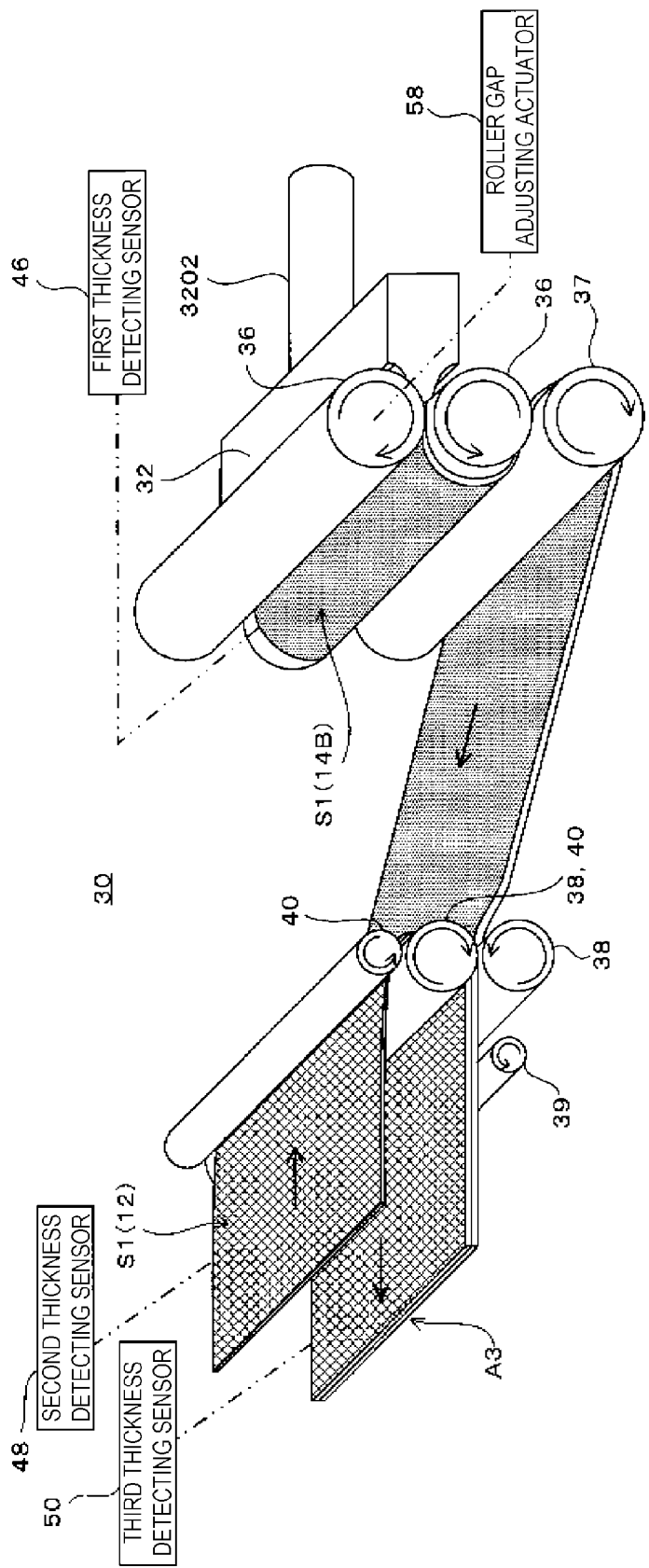
FIG. 5 is an explanatory diagram of a step of producing a first intermediate laminate A3 by laminating the belt core body 12 and a second cover rubber 14B in the method for producing a laminate according to the embodiment.

Here, in order to simplify the diagrams in FIG. 3 to FIG. 5 illustrated below, the illustration of the positioning structure 42, the cutting structure 44, the belt core body position detecting sensor 52, the ear rubber position detecting sensor 54, the ear rubber position adjusting actuator 60, and the like which are not used is omitted.

1) Production of Belt Core Single Body 12A

The original material formed by the fiber reinforcement layer 1202 is prepared.

As illustrated in FIG. 3, rubber material extruded from the first rubber extruder 32 is rolled by the first pair of rollers 36 and 36, so that the first coating rubber 1204A is formed as the first sheet-shaped member S1 (first step).

The first sheet-shaped member S1 and the fiber reinforcement layer 1202 as the second sheet-shaped member S2 supplied from the original material are layered and then rolled by the second pair of rollers 38 and 38, so that a laminate A1 having the first sheet-shaped member S1 and the second sheet-shaped member S2 laminated therein is contiguously produced (second step).

In addition, in the first step and the second step, the gap between the first pair of rollers 36 and 36 is controlled by the control device 56.

The laminate A1 is wound by a winding apparatus (not illustrated) so as to be the original material.

That is, the laminate A1 forms a part in the thickness direction of the belt core body 12 of the conveyor belt 10 in which the first coating rubber 1204A is laminated on one surface of the fiber reinforcement layer 1202, and is, in other words, an intermediate product of the belt core body 12.

Next, the original material formed by the laminate A1 produced as described above is prepared.

As illustrated in FIG. 4, rubber material extruded from the first rubber extruder 32 is rolled by the first pair of rollers 36 and 36, so that the second coating rubber 1204B is formed as the first sheet-shaped member S1 (first step).

The first sheet-shaped member S1 and the laminate A1 as the second sheet-shaped member S2 supplied from the original material are layered and then rolled by the second pair of rollers 38 and 38, so that a laminate A2 having the first sheet-shaped member S1 and the second sheet-shaped member S2 laminated therein is contiguously produced (second step).

In addition, in the first step and the second step, the gap between the first pair of rollers 36 and 36 is controlled by the control device 56.

The laminate A2 is wound by a winding apparatus (not illustrated) so as to be the original material.

That is, the laminate A2 is the belt core single body 12A of the conveyor belt 10 including the fiber reinforcement layer 1202, the first coating rubber 1204A laminated on one surface of the fiber reinforcement layer 1202, and the second coating rubber 1204B laminated on the other surface of the core body.

By repeating such steps, the original material formed by the plurality of belt core single bodies 12A is produced.

2) Production of Belt Core Body 12

The original material formed by the plurality of belt core single bodies 12A obtained as described above is prepared. Then, the belt core single bodies 12A are rolled by a pair of pressure rollers (not illustrated), so that the belt core body 12 is produced. The belt core body 12A is wound by a winding apparatus (not illustrated) so as to be the original material.

3) Production of First Intermediate Laminate

The original material formed by the belt core body 12 produced as described above is prepared.

As illustrated in FIG. 5, rubber material extruded from the first rubber extruder 32 is rolled by the first pair of rollers 36 and 36, so that the second cover rubber 14B is formed as the first sheet-shaped member S1 (first step).

The first sheet-shaped member S1 and the belt core body 12 as the second sheet-shaped member S2 supplied from the original material are layered and then rolled by the second pair of rollers 38 and 38, so that a laminate A3 having the first sheet-shaped member S1 and the second sheet-shaped member S2 laminated therein is contiguously produced (second step).

In addition, in the first step and the second step, the gap between the first pair of rollers 36 and 36 is controlled by the control device 56.

The laminate A3 is wound by a winding apparatus (not illustrated) so as to be the original material.

That is, the laminate A3 is the first intermediate laminate A3 including the belt core body 12 and the cover rubber (the second cover rubber 14B) laminated on the belt core body 12 and forming a part in the thickness direction of the conveyor belt 10.

4) Production of Conveyor Belt 10

The original material formed by the first intermediate laminate A3 produced as described above is prepared.

As illustrated in FIG. 6, rubber material extruded from the first rubber extruder 32 is rolled by the first pair of rollers 36 and 36, so that the first cover rubber 14A is formed as the first sheet-shaped member S1 (first step).

Next, the ear rubber 16 extruded from the second rubber extruder 34 is rolled by the third pair of rollers 40 and 40 and then laminated on the second cover rubber 14B at both side sections in the width direction of the belt core body 12 of the first intermediate laminate A3 as the second sheet-shaped member S2 supplied from the original material, so that a second intermediate laminate A4 is formed (third step). At this time, position adjustment control of the ear rubber 16 is performed by the control device 56.

Then, the first sheet-shaped member S1 and the second intermediate laminate A4 including the second sheet-shaped member S2 (the first intermediate laminate A3) are layered and then rolled by the second pair of rollers 38 and 38, so that a laminate A5 having the first sheet-shaped member S1 and the second sheet-shaped member S2 laminated therein is contiguously produced (second step).

In addition, in the second step, both side end sections B in the width direction of the laminate A5 fed out from the second pair of rollers 38 and 38 are cut with the cutter of the cutting structure 44 (FIG. 1A), and the both side end sections B, which are cut, are contiguously returned to the upstream side of the first rubber extruder 32 by transport structure (not illustrated) to be used as rubber material.

In addition, in the first to third steps, the gap between the first pair of rollers 36 and 36 is controlled by the control device 56.

The laminate A5 is wound by a winding apparatus (not illustrated).

That is, the laminate A5 is the conveyor belt 10 formed by the belt core body 12, the first cover rubber 14A, the second cover rubber 14B, and the ear rubber 16.

In the embodiment described above, description has been given of a method for producing the conveyor belt 10 having the ear rubber 16; however, it goes without saying that the method of the present technology is applicable to a conveyor belt 10 not having the ear rubber 16.

In such a case, the above-described 4) Production of Conveyor Belt 10 is as follows.

The original material formed by the first intermediate laminate A3 produced as described above is prepared.

Rubber material extruded from the first rubber extruder 32 is rolled by the first pair of rollers 36 and 36, so that the first cover rubber 14A is formed as the first sheet-shaped member S1 (first step).

Next, the first sheet-shaped member S1 and the first intermediate laminate A3 as the second sheet-shaped member S2 are layered and then rolled by the second pair of rollers 38 and 38, so that a laminate having the first sheet-shaped member S1 and the second sheet-shaped member S2 laminated therein is contiguously produced (second step).

In addition, in the second step, both side end sections B in the width direction of the laminate fed out from the second pair of rollers 38 and 38 are cut with the cutter of the cutting structure 44, and the both side end sections B, which are cut, are contiguously returned to the upstream side of the first rubber extruder 32 to be used as rubber material.

In addition, in the first and second steps, the gap between the first pair of rollers 36 and 36 is controlled by the control device 56.

The laminate is wound by a winding apparatus (not illustrated).

That is, the laminate is the conveyor belt 10 formed by the belt core body 12, the first cover rubber 14A, and the second cover rubber 14B.

According to the embodiment as described above, when contiguously producing the laminate having the first sheet-shaped member S1 and the second sheet-shaped member S2 laminated therein, the gap between the first pair of rollers 36 and 36 is controlled on the basis of the detection result of the thickness d1 of the first sheet-shaped member S1 rolled by the first pair of rollers 36 and 36, the detection result of the thickness d2 of the second sheet-shaped member S2 supplied from the original material, and the detection result of the thickness d3 of the laminate.

Accordingly, it is possible to adjust the thickness of the first sheet-shaped member S1 according to variations in the thickness of the second sheet-shaped member S2 so that the thickness of the laminate matches a target value, which results in an advantage in terms of reducing variations in the thickness of the laminate having the first sheet-shaped member S1 and the second sheet-shaped member S2 laminated therein.

Therefore, it is possible to reduce defects in the surface of the laminate during vulcanization, which are generated in a case where the thickness of the laminate is excessively great, and there is an advantage in terms of suppressing wasted material in a case where the thickness of the laminate is excessively great.

In addition, when the first sheet-shaped member S1 and the second sheet-shaped member S2 are rolled by the second pair of rollers 38, since the first sheet-shaped member S1 has just been extruded from the first rubber extruder 32, the first sheet-shaped member S1 is still in a high temperature state.

Accordingly, since the first sheet-shaped member S1 and the second sheet-shaped member S2 are hot-bonded, even if both or either of the first sheet-shaped member S1 and the second sheet-shaped member S2 are materials having low tack (tackiness), it is possible to securely bond and laminate the sheet-shaped members S1 and S2 without employing a solvent or the like, which results in an advantage in terms of increasing the quality of the laminate.

In addition, when the ear rubber 16 and the second cover rubber 14B of the first intermediate laminate A3 as the second sheet-shaped member S2 are rolled by the third pair of rollers 40 and 40, because the ear rubber 16 has just been extruded from the second rubber extruder 34, the ear rubbers 16 is still in a high temperature state.

Accordingly, since the ear rubber 16 and the second sheet-shaped member S2 are hot-bonded, even if either or both of the ear rubber 16 and the second sheet-shaped member S2 are materials having low tack (tackiness), it is possible to securely bond and laminate the ear rubber 16 and the second sheet-shaped member S2 without employing a solvent or the like, which results in an advantage in terms of increasing the quality of the laminate.

In addition, the positioning of the ear rubber 16 is controlled by the positioning structure 42 on the basis of the detection result of the positions P1, detected by the belt core body position detecting sensor 52, of end surfaces on both sides in the width direction of the belt core body 12 directly before being rolled by the third pair of rollers 40 and 40 and the detection result of the positions P2, detected by the ear rubber position detecting sensor 54, in the width direction of the ear rubber 16 directly before being rolled by the third pair of rollers 40 and 40.

Accordingly, it is possible to laminate the ear rubber 16 on the second cover rubber 14B without forming a gap between the end surfaces 1210 and the ear rubber 16 on both sides of the belt core body 12 in the width direction, which results in an advantage in terms of increasing the quality of the conveyor belt 10.

In addition, in the second step, the both side end sections B in the width direction of the laminate A5 fed out from the second pair of rollers 38 and 38 are cut with the cutter of the cutting structure 44, and the both side end sections B, which are cut, are contiguously returned to the upstream side of the first rubber extruder 32 by transport structure to be used as rubber material.

Accordingly, it goes without saying that a space for temporarily storing the both side end sections B which are cut is not necessary, and time and effort is not spent on steps deviating from producing the laminate, such as transporting a set amount of both side end sections for the step of mixing the rubber material every time a set amount of both side end sections B builds up, resulting in an advantage in terms of space saving and streamlining of production.

In addition, employing the same producing method and the same production apparatus 30 when the conveyor belt is produced as described above makes it possible to produce the intermediate product of the belt core body 12, the belt core single body 12A, the first intermediate laminate A3, and the conveyor belt 10.

Accordingly, in comparison with a case where the production line is formed by separately providing the production apparatus for the intermediate product of the belt core body 12, the production apparatus for the belt core single body 12A, the production apparatus for the first intermediate laminate A3, and the production apparatus for the conveyor belt 10, there are advantages in terms of saving space and streamlining the facilities since it is possible to greatly reduce the number of production apparatuses. In addition, there is an advantage in terms of saving labor since it is not necessary to arrange workers at each of the production apparatuses.

Here, in the embodiment, description has been given of a case of producing the conveyor belt 10; however, the present technology is applicable to the production of various laminates having the first sheet-shaped member S1 and the second sheet-shaped member S2 laminated therein.

What is claimed is:

1. A method for producing a laminate comprising:
   a first step of rolling rubber material extruded from a first rubber extruder with a first pair of rollers to form a first sheet-shaped member;
   a second step of layering and rolling the first sheet-shaped member and a second sheet-shaped member supplied from an original material to contiguously produce a laminate having the first sheet-shaped member and the second sheet-shaped member laminated therein; and a gap between the first pair of rollers being controlled based on a detection result of a thickness d1 of the first sheet-shaped member rolled by the first pair of rollers, a detection result of a thickness d2 of the second sheet-shaped member supplied from the original material, and a detection result of a thickness d3 of the laminate;

wherein:

the laminate is a conveyor belt including a belt core body, a first cover rubber laminated on one surface of the belt core body, and a second cover rubber laminated on another surface of the belt core body, the first sheet-shaped member is the first cover rubber, the second sheet-shaped member is a first intermediate laminate having the belt core body and the second cover rubber laminated therein, the laminate further includes an ear rubber arranged on both side sections of the belt core body in a width direction between the first cover rubber and the second cover rubber, before the second step, a third step is performed of rolling the ear rubber extruded from a second rubber extruder with a third pair of rollers to be laminated on the second cover rubber of the second sheet-shaped member at both side sections of the belt core body in the width direction to form a second intermediate laminate, in the second step, the second intermediate laminate, including the second sheet-shaped member, and the first sheet-shaped member are laminated, in the second sheet-shaped member, a width of the belt core body is less than a width of the second cover rubber and a band-like ear rubber placement surface on which the belt core body is not positioned is formed to have dimensions corresponding to a width of the ear rubber at both sides in the width direction of a surface of the second cover rubber having the belt core body laminated thereon, a positioning structure is provided for positioning the ear rubber extruded from the second rubber extruder in the width direction of the second cover rubber with respect to the ear rubber placement surface of the second sheet-shaped member, and the positioning of the ear rubber is controlled by the positioning structure based on a detection result of positions P1 of both side end surfaces in the width direction of the belt core body directly before being rolled by the third pair of rollers and a detection result of a position P2 in the width direction of the ear rubber directly before being rolled by the third pair of rollers.

2. The method for producing a laminate according to claim 1, wherein in the second step, both side end sections of the laminate in a width direction fed out from a second pair of rollers are cut, and the both side end sections that are cut are contiguously returned to an upstream side of the first rubber extruder to be used as rubber material.

3. The method for producing a laminate according to claim 1, wherein the laminate includes a fiber reinforcement layer and a first coating rubber laminated on one surface of the fiber reinforcement layer and forms a part of the belt core body of the conveyor belt in a thickness direction, the first sheet-shaped member is the first coating rubber, and the second sheet-shaped member is the fiber reinforcement layer.

4. The method for producing a laminate according to claim 1, wherein the laminate is a belt core single body of a conveyor belt including a fiber reinforcement layer, a first coating rubber laminated on one surface of the fiber reinforcement layer, and a second coating rubber laminated on another surface of the core body, the first sheet-shaped member is the second coating rubber, and the second sheet-shaped member is the fiber reinforcement layer and the first coating rubber.

5. The method for producing a laminate according to claim 1, wherein the laminate is a first intermediate laminate including a belt core body and a cover rubber laminated on the belt core body and forming a part of a conveyor belt in a thickness direction, the first sheet-shaped member is the cover rubber, and the second sheet-shaped member is the belt core body.

* * * * *